(12) United States Patent
Deck et al.

(10) Patent No.: US 8,102,278 B2
(45) Date of Patent: Jan. 24, 2012

(54) WIRELESS COMMUNICATION

(75) Inventors: Thomas Deck, Wolfach (DE); Jürgen Skowaisa, Schiltach (DE); Holger Sack, Schiltach (DE); Robert Laun, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 129 days.

(21) Appl. No.: 10/534,934

(22) PCT Filed: Nov. 17, 2003

(86) PCT No.: PCT/EP03/12854
§ 371 (c)(1),
(2), (4) Date: Sep. 13, 2005

(87) PCT Pub. No.: WO2004/047043
PCT Pub. Date: Jun. 3, 2004

(65) Prior Publication Data
US 2006/0049961 A1 Mar. 9, 2006

(30) Foreign Application Priority Data
Nov. 15, 2002 (DE) .................. 102 53 572

(51) Int. Cl.
*G08C 17/00* (2006.01)
(52) U.S. Cl. ............. 340/870.07; 340/540; 340/618
(58) Field of Classification Search ............ 340/540, 340/618, 870.07
See application file for complete search history.

(56) References Cited

U.S. PATENT DOCUMENTS

| | | | |
|---|---|---|---|
| 5,257,190 A | 10/1993 | Crane | |
| 5,682,476 A | 10/1997 | Tapperson et al. | |
| 5,745,049 A | 4/1998 | Yoshitake et al. | |
| 5,765,995 A | 6/1998 | Springer | |
| 6,107,917 A | 8/2000 | Carrender et al. | |
| 6,415,660 B1 * | 7/2002 | Sinz et al. ............ | 73/290 R |
| 2001/0028305 A1 | 10/2001 | Taylor et al. | |
| 2001/0045892 A1 | 11/2001 | Davis et al. | |
| 2002/0004370 A1 | 1/2002 | Stengele et al. | |
| 2002/0082755 A1 | 6/2002 | Tanaka | |
| 2003/0174067 A1 | 9/2003 | Soliman | |
| 2004/0074295 A1 * | 4/2004 | Michalski et al. ......... | 73/290 R |

FOREIGN PATENT DOCUMENTS

| | | |
|---|---|---|
| CN | 11 70 464 | 1/1998 |
| DE | 196 04 467 | 8/1997 |
| DE | 196 23 546 | 12/1997 |
| DE | 19933814 | 7/1999 |
| DE | 199 62 954 | 6/2001 |
| DE | 10032774 | 1/2002 |
| SU | 622141 | 8/1978 |
| SU | 1231485 | 5/1986 |
| WO | 96/12993 | 5/1996 |
| WO | 01/01366 | 1/2001 |

* cited by examiner

*Primary Examiner* — Tuan T Dinh
*Assistant Examiner* — Hung Dang
(74) *Attorney, Agent, or Firm* — Fay Kaplun & Marcin, LLP

(57) ABSTRACT

Described is a sensor unit having a measured signal receiver, which registers a measured signal, an A/D converter for digitizing the measured signal, a transceiver device for wireless data communication to an environmental device, and a processor. The processor is a control processor for activating the measured signal receiver, the A/D converter, and the transceiver device. The digitized measured signal is transmitted directly via the transceiver device to the environmental device, without the complex and performance-intensive and therefore costly analysis occurring in the sensor unit.

27 Claims, 5 Drawing Sheets

WIRELESS COMMUNICATION

TECHNICAL AREA

The present invention relates to a sensor unit having a measured signal receiver, which registers a measured signal, an A/D converter connected to the measured signal receiver for digitizing the registered measured signal, and a transceiver device for wireless data transmission to and/or from an environmental device. The components cited are controlled using a processor. Furthermore, the present invention relates to a data communication system which comprises multiple sensor units of the cited type and an environmental device. In addition, the present invention also relates to an environmental device which is implemented for wireless communication (comprising transceiver operation) using at least one sensor unit of the cited type and in which an analysis unit is integrated or which may be coupled to an analysis unit.

BACKGROUND OF THE PRESENT INVENTION

Sensors are used in a wide-ranging technical environment. Thus, for example, particularly in automation and processing technology, sensors are currently used for measuring process parameters such as fill level, pressure, temperature, etc. Actuators, such as valves, heating elements, or the like are used to influence the process parameters. According to the related art, the measured values determined by the sensors are analyzed by a process control system and the actuators are activated in order to be able to have the process run in the predefined process window. Since the sensors are often positioned at points of a manufacturing facility which are widely separated in space, wire-bound communication of the sensors with the process control system and with control and display units is often connected with a high cost outlay.

As a result of this, efforts have been undertaken to implement the communication of the sensors with the process control system and with control and display units wirelessly, on the basis of the Bluetooth standard, for example. DE 100 32 774 A1 describes a system in which field devices are wirelessly connected to a control and display unit for data input and display for process automation. According to this publication, the control and display unit is implemented as a separate portable unit. Furthermore, this publication discloses that the wireless connection is produced in accordance with the Bluetooth standard. According to one embodiment of DE 100 32 774 A1 cited, the field devices of a processing facility are exclusively connected wirelessly to a junction, which is linked via a data bus to the process control system. As a result, the field devices transmit the current measured values wirelessly to the process control system, which in turn activates the different actuators on the basis of the measured values.

A system for wireless information transmission for multiple sensors and/or actuators on a machine is known from DE 199 33 814 A1. The known system comprises multiple users such as sensors or actuators and a base station. The base station preferably emits a broadband high-frequency signal produced according to the DSSS method. The users are located at different distances from the base station. The users code the high-frequency signal received according to the SDMA method, modulate it, and reflect it back to the base station. Signal correlation and demodulation is performed in the base station.

The field devices or sensor units known from the related art have the disadvantage that each sensor unit is equipped with a processor which must assume both the tasks of controlling measured signal receivers, A/D converters, and interfaces, and also processing the measured signal. Processors which may assume these tasks are costly to provide and operate.

DESCRIPTION OF THE PRESENT INVENTION

According to a first aspect of the present invention, a sensor unit according to the present invention comprises a measured signal receiver which registers a measured signal. An A/D converter is connected to the measured signal receiver, which digitizes the registered measured signal. Wireless data communication to an environmental device is performed using a transceiver device, which is coupled to the A/D converter. A processor is provided in the sensor unit, which activates the measured signal receiver, the A/D converter, and the transceiver device in such a way that the registered measured signal is digitized and subsequently wirelessly transmitted directly via the transceiver device to the incremental device. According to a first exemplary alternative, this transmission device has an analysis unit which processes the digitized measured signal further into a measured value. A second alternative provides that the analysis unit is coupled to the environmental device, but is not an integral component of the environmental device.

The present invention is based on the idea of providing a sensor unit which is cost-effective to manufacture and operate. In particular, by "outsourcing" the analysis of a measured signal from the sensor unit, among other things, in spite of the transceiver device to be operated, a low power supply is sufficient to supply the sensor with power. In particular, according to an exemplary embodiment of the present invention, power may then also be supplied via a 4-20 mA two-wire loop. As already noted, according to the present invention, the digitized measured signals are transmitted directly, i.e., without signal processing after the A/D conversion, via the transceiver device to the environmental device. Therefore, a powerful processor of a sensor unit known according to the related art, which assumes both control and also signal processing tasks, may be replaced by a smaller and less powerful and therefore more cost-effective processor, that particularly requires less power, which exclusively assumes control tasks.

The signal processing of the measured signal received from the sensor unit is performed in an analysis unit which is housed in the central environmental device or is connected thereto, by a powerful signal processing processor. When signal processing processors are discussed, this of course refers to a processor which may also assume control tasks in addition to signal processing. Furthermore, it is also conceivable, however, that the environmental device has a separate control processor and a separate signal processing processor. As a result, the one analysis unit of the environmental device may thus assume the signal processing of multiple sensor units. Each individual sensor unit is only equipped with a simple and cost-effective control processor in this case, the analysis unit having a complex and powerful signal processing processor.

In summary, by using less powerful control processors, the manufacturing costs for a sensor unit and also its operating costs may be reduced, because of the lower power consumption of these processors, for example. A further advantage of the present invention is that using this arrangement, the computing time available is employed better. Because of the different cycle times of the sensors, idle time, i.e., time in which no computing power is necessary for data processing or for control, exists in sensor units having integrated signal processing. If the signal processing is assumed by a single analysis unit, the processor power for signal analysis may be adapted in accordance with the different cycle time requirements of the different sensor units, so that as a result nearly all of the available entire processor power is employed.

In an exemplary embodiment of the present invention, the measured signal receiver, the A/D converter, and the transceiver unit each have a data input, a data output, and a control input. For this purpose, the data input the A/D converter is connected to the data output of the measured signal receiver and the data input of the transceiver unit is connected to the data output of the A/D converter. Furthermore, the transceiver unit exchanges data with the environmental device via its data output. In addition, the processor has an influence on the measured signal receiver, the A/D converter, and the transceiver device via each of the control inputs. For this purpose, it is additionally to be noted that it is also possible to transmit configuration data or the like to a sensor unit via the environmental device, for example. A pure transmission device and also a transceiver device are thus to be subsumed under a "transceiver device" here.

According to a further exemplary embodiment, the sensor unit is a fill level sensor, using which the fill level of liquids in containers may be detected, for example.

According to a further exemplary embodiment, the measured signal receiver of the fill level sensor transmits and receives a radar signal, an ultrasound signal, or a microwave signal guided on a wire, for example. The use of a guided microwave signal has the advantage that the container fill level may be measured locally.

According to a further exemplary embodiment, the measured signal is a propagation time signal, the propagation time between emitting a reference signal and receiving one or more signals reflected from the liquid surface being analyzed.

In a further exemplary embodiment, bidirectional data transmission occurs between the sensor unit and the environmental device having an analysis unit. Thus, a measured signal flow from the sensor unit to the environmental device and also a data flow from the environmental device to the sensor unit, in the form of control commands, for example, is conceivable.

According to a further especially preferred embodiment, the wireless transmission of the data between the sensor unit and the environmental device having an analysis unit is performed in accordance with the WLAN standard, or the wireless personal area network standard, having multiple substandards such as Bluetooth, the HiperLAN 2 standard, DECT, the GSM standard, or the UMTS standard. Bluetooth technology will be discussed in this context as an example. Bluetooth technology is an open specification for wireless transmission of data and speech. It is based on a cost-effective shortwave technology which may be implemented in a microchip and allows a secured ad hoc connection between fixed and mobile terminals. Bluetooth technology is on a broad platform of applications and was established as a standard in 1998 by Ericsson, Intel, Nokia, IBM, and Toshiba.

In a further exemplary embodiment, bidirectional data transmission occurs between the environmental device having an analysis unit and the process control system. Thus, for example, it is conceivable that the environmental device having an analysis unit is connected to the process control system wirelessly or via a wire. In particular, the wireless connection of the environmental device having a control unit to the process control system makes an especially flexible design of the entire system possible.

In a further embodiment of the present invention, bidirectional data transmission occurs between the environmental device having an analysis unit and the process control system, the environmental device having an analysis unit transmits the generated measured values to the process control system, and the environmental device having an analysis unit receives control commands from the process control system.

According to a further exemplary embodiment, the environmental device having an analysis unit is a mobile device. For this purpose, for example, it is conceivable that the environmental device having an analysis unit is integrated into a portable computer (laptop) or a PDA.

According to a further exemplary embodiment, the sensor unit is wirelessly connected to a further environmental device, the further environmental device comprising a control and display unit. Through the wireless implementation of the connection between sensor unit and the environmental device having a control and display unit, the complex and costly wiring between the two devices is saved. Furthermore, the operator may have an influence at various locations in connection with the feature that the environmental device having a control and display unit is a mobile device, such as a portable computer. This means that an operator may move independently of the location of the sensor unit and, through the environmental device having a control and display unit, load data and parameters from the sensor and display and transmit them.

According to a further exemplary embodiment, the environmental device having a control and display unit and the environmental device having an analysis unit are wirelessly connected to one another.

In a further exemplary embodiment, bidirectional data transmission occurs between the environmental device having a control and display unit and the environmental device having an analysis unit. Thus, for example, it is conceivable for parameter data which is transmitted from an environmental device (for example, having a control and display unit) to the sensor unit to also be transmitted to the environmental device having an analysis unit, the environmental device having an analysis unit optimizing and adapting the parameter data to control commands from the process control system. The optimized parameter data thus obtained is subsequently relayed by the environmental device having an analysis unit to the environmental device having a control and display unit.

A further possibility provided by the connection between environmental device having an analysis unit and environmental device having an operating and display unit is that the environmental device having a control and display unit may influence the environmental device having an analysis unit in such a way that algorithms which are used during the signal processing may be altered, tested, and optimized.

In a further exemplary embodiment of the present invention, the sensor unit has a further transceiver device which communicates with the environmental device having a control and display unit. Through this feature, a separate transceiver device is available in each case for the communication of the sensor unit with the environmental device having an analysis unit and with the environmental device having a control and display unit.

Analogously to the wireless transmission of data between the sensor unit and the environmental device having an analysis unit, it is also advisable for the wireless transmission of data between the sensor unit and the environmental device having a control and display unit and/or between the environmental device having a control and display unit and the environmental device having an analysis unit if this transmission occurs according to one of the standards already cited above.

In a further exemplary embodiment of the present invention, the analysis unit and the control and display unit are integrated into one single environmental device. A cost reduction may be achieved through the integration of the different components into one device.

Furthermore, a data communication system, which comprises multiple sensor units, as were explained above, and an environmental device having an analysis unit, is also to be placed under protection. Consequently, multiple sensor units may be activated independently from one another and/or the measured signals received from these sensor units may be transmitted to the environmental device having an analysis unit by this data communication system. In the environmental device having an analysis unit, the different measured signals of the sensor units are processed further into measured values by the analysis unit in signal processing processes. The measured values produced are then transmitted to a process control system, for example, which controls the entire sequence of the manufacturing process of the production facility on the basis of these measured values.

In a further embodiment, the data communication system also comprises an environmental device having a control and display unit. Therefore, using the environmental device having a control and display unit, the different sensor units may be influenced independently of one another, without these sensor units being connected to the control and display unit via wires.

According to a further aspect of the present invention, the present invention also relates to an environmental device which comprises a transceiver device that is implemented for wireless communication with at least one sensor device of the type described above. Furthermore, the environmental device comprises an analysis unit in which the measured signals wirelessly received from a sensor are analyzed and finally a value is generated which represents a measured value to be measured by the sensor and which may then be relayed to a display unit or even a control post, for example. This calculated measured value is then used for process control or displayed (such as fill level, temperature, pressure, flow volume, etc.). As an alternative to this exemplary embodiment of the present invention, the environmental device is not equipped with the analysis unit, but may be connected or coupled to an external analysis unit.

BRIEF DESCRIPTION OF THE DRAWING

In the following, an exemplary embodiment of the present invention is described in greater detail with reference to the attached drawing for better understanding and explanation.

DESCRIPTION OF AN EXEMPLARY
EMBODIMENT OF THE PRESENT INVENTION

Figure 1:
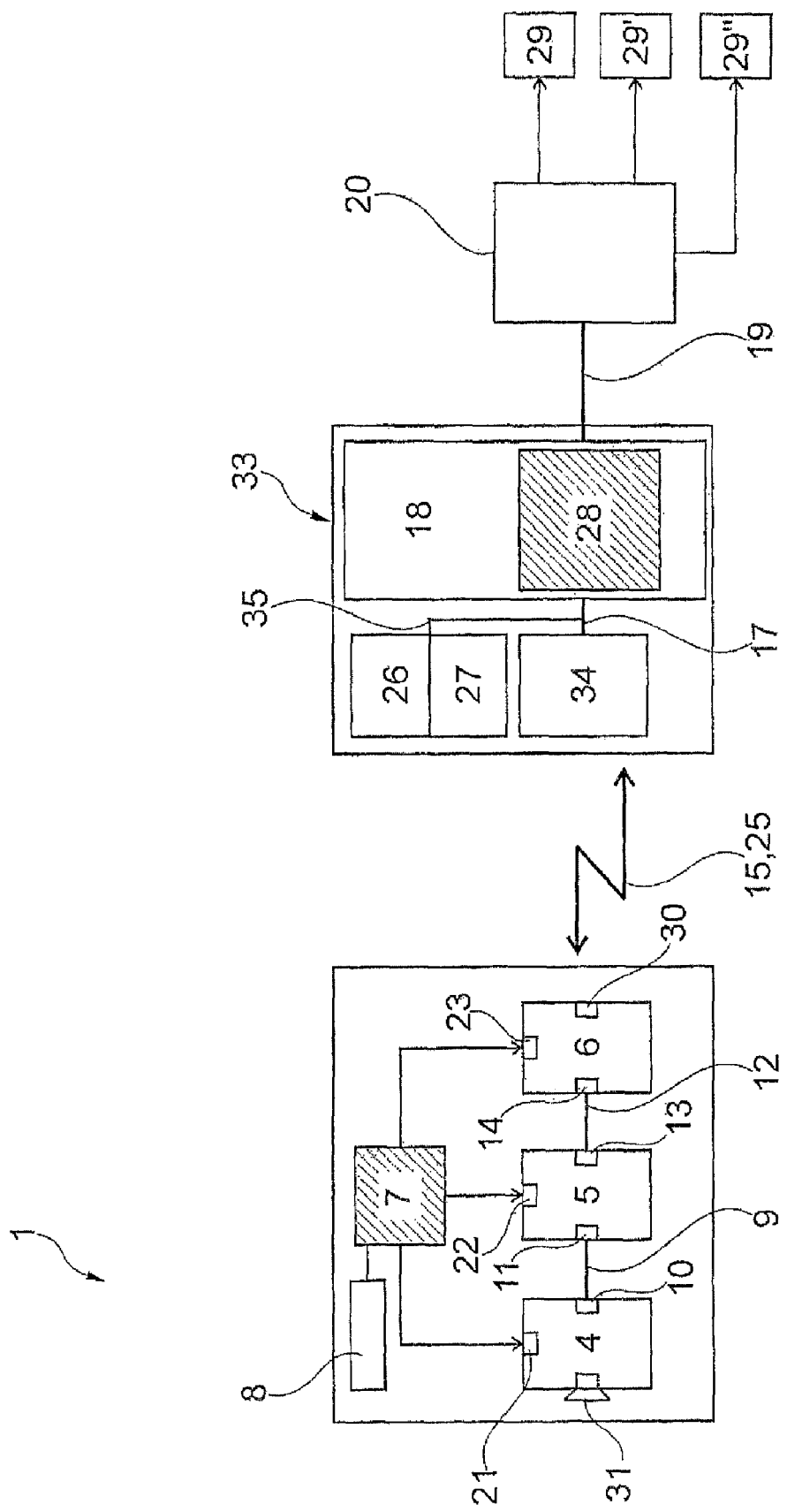
FIG. 1 shows a block diagram of the sensor unit according to the present invention having an environmental device having an analysis unit and an environmental device having a control and display unit.

FIG. 1a shows a sensor unit 1 according to the present invention, which is wirelessly connected to an environmental device 2 having an analysis unit 18 and to an environmental device 3 having a control and display unit 26, 27. The sensor unit 1 comprises a measured signal receiver 4 for registering a measured signal 9, an A/D converter 5 for digitizing the measured signal 9 and a transceiver device 6 for wireless data transmission between the sensor unit 1 and the environmental devices 2 and 3. Furthermore, the sensor unit 1 has a control processor 7 for controlling the measured signal receiver 4, the AID converter 5, and the transceiver device 6. Parameters and calibration data necessary for the measurement sequence are stored in a memory 8. The control processor 7 has a direct influence on the memory 8 and calls parameters and calibration data from the memory 8 and/or writes them in the memory 8.

In the present exemplary embodiment, the sensor unit 1 is a fill level sensor. The measured signal receiver 4 of the fill level sensor 1 transmits and receives a radar signal, an ultrasound signal, or a guided microwave signal, which are generally to be referred to as the measured signal 9, via a data input 31 for this purpose. The measured signal 9 may be converted from an ultrasound signal into an electrical signal in the measured signal receiver 4 for this purpose, for example. Subsequently, the measured signal 9 is output by a data output 10 of the measured signal receiver 4 and received by a data input 11 of the A/D converter 5 and digitized in the A/D converter 5. Subsequently, the digitized measured signal 12 is output by a data output 13 of the A/D converter 5 and received by a data input 14 of the transceiver device 6. The transceiver device 6 converts the digitized measured signal 12 into a radio signal 15 and outputs it via a data output 30. The radio signal 15 is received by a transceiver device 16 of the environmental device 2 having analysis unit 18. The transceiver device 16 again converts the radio signal 15 into a digitized measured signal 17, which is subsequently processed further into a measured value 19 in an analysis unit 18. The measured value 19 is output to a process control system 20 by the analysis unit 18 via possible further stations, which will not be discussed in this context. The process control system 20 in turn receives measured values 19 from greatly varying sensor units via the environmental device 2 having analysis unit 18 (in FIG. 1a, only the measured value 19 of the sensor unit 1 is shown). The different measured values are processed further in the process control system 20, i.e., the process control system 20 regulates the activation of actuators 29, 29', 29" on the basis of the different measured values 19 to influence the process and control of a manufacturing facility.

The control of the measurement sequence by the measured value receiver 4 and the conversion of the analog signal by the analog and digital converter 5 and also the activation of the transceiver device 6 are assumed by the control processor 7. For this purpose, the control processor 7 is connected to the control inputs 21, 22, and 23 of the measured signal receiver 4, the A/D converter 5, and the transceiver device 6. Since the control processor 7 only assumes the activation of the measured signal receiver 4, the A/D converter 5, and the transceiver device 6, but not the analysis of the measured signal 9 and/or 12, high requirements are not placed on the performance of the control processor 7 in comparison to a signal analysis processor 28. This has the result that the control processor 7 is cost-effective to provide and operate.

In order to exchange calibration data and parameter data for controlling the measurement sequence and operational status data between the sensor unit 1 and the environmental device 3 having control and display unit 26, 27, the environmental device 3 having control and display unit 26, 27 has a transceiver device 24. The transceiver device 24 communicates wirelessly with the transceiver device 6 of the sensor unit 1, through the Bluetooth standard, for example. In this way, status and parameter data 25 is transmitted between the sensor unit 1 and the environmental device 3 having control and display unit 26, 27.

In order to optimize the signal processing, i.e., improve, test, and optimize parameters of the signal processing algorithms in accordance with the results from the signal processing, a wireless bidirectional exchange of control data 32 occurs between the environmental device 3 having control and display unit 26, 27 and the environmental device 2 having analysis unit 18. In this way, it is ensured that the signal processing may be influenced using the environmental device 3 having control and display unit 26, 27 during the signal processing process. The exchange of the control data 32 is mediated via the transceiver device 24 of the environmental device 3 having control and display unit 26, 27 and by the transceiver device 16 of the environmental device 2 having analysis unit 18.

FIG. 1b has essentially the same features as FIG. 1a, with the difference that an embodiment is illustrated in which both the analysis unit 18 and also the control and display unit 26, 27 are integrated into one single environmental device 33. The environmental device 33 also has a transceiver device 34, which exchanges non-analyzed measured signals 15 and status and parameter data 25 in the form of radio signals with the transceiver device 6 of the sensor unit 1. Furthermore, wire-bound control data 35 is exchanged between the control and display unit 26, 27 and the analysis unit 18.

Figure 2:
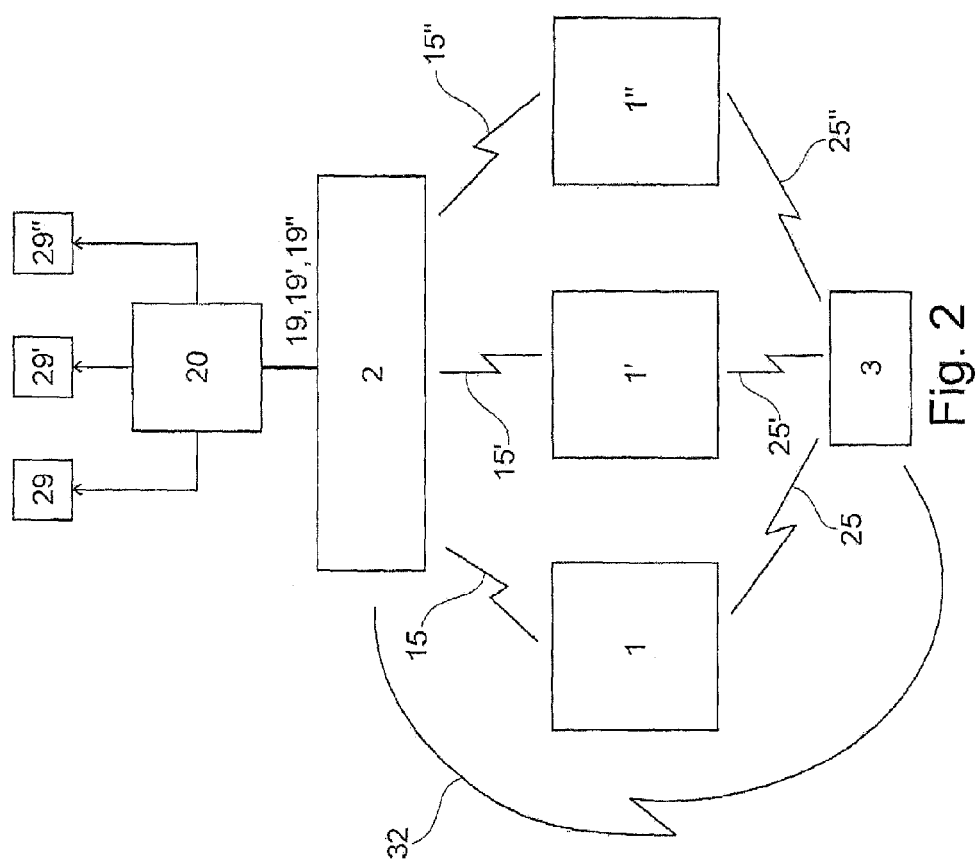
FIG. 2 shows a block diagram of the data communication system according to the present invention.

FIG. 2 shows a data communications system, comprising three sensor units 1, 1', and 1", each of which are wirelessly connected to an environmental device 2 having analysis unit 18 and an environmental device 3 having a control and display unit. In the present exemplary embodiment, the wireless data transmission is performed by both environmental devices 2, 3 according to the Bluetooth standard. Each sensor unit 1, 1', and 1" emits radio signals 15, 15', and 15". For this purpose, the radio signals 15, 15', and 15" contain non-analyzed measured signals of the sensor units 1, 1', 1", since analysis and signal processing occurs in the environmental device 2 having analysis unit 18. The environmental device 2 having an analysis unit transmits the measured values 19, 19', 19" generated in its analysis device 18 to the process control system 20, which transmits control commands based thereon to actuators 29, 29', 29" (and sensors).

The parameterization and the status query of the sensor units 1, 1', and 1" is performed through status and parameter data 25, 25', and 25", which is exchanged between the sensor units 1, 1', and 1" and the environmental device 3 having control and display unit 26, 27.

Figure 3:
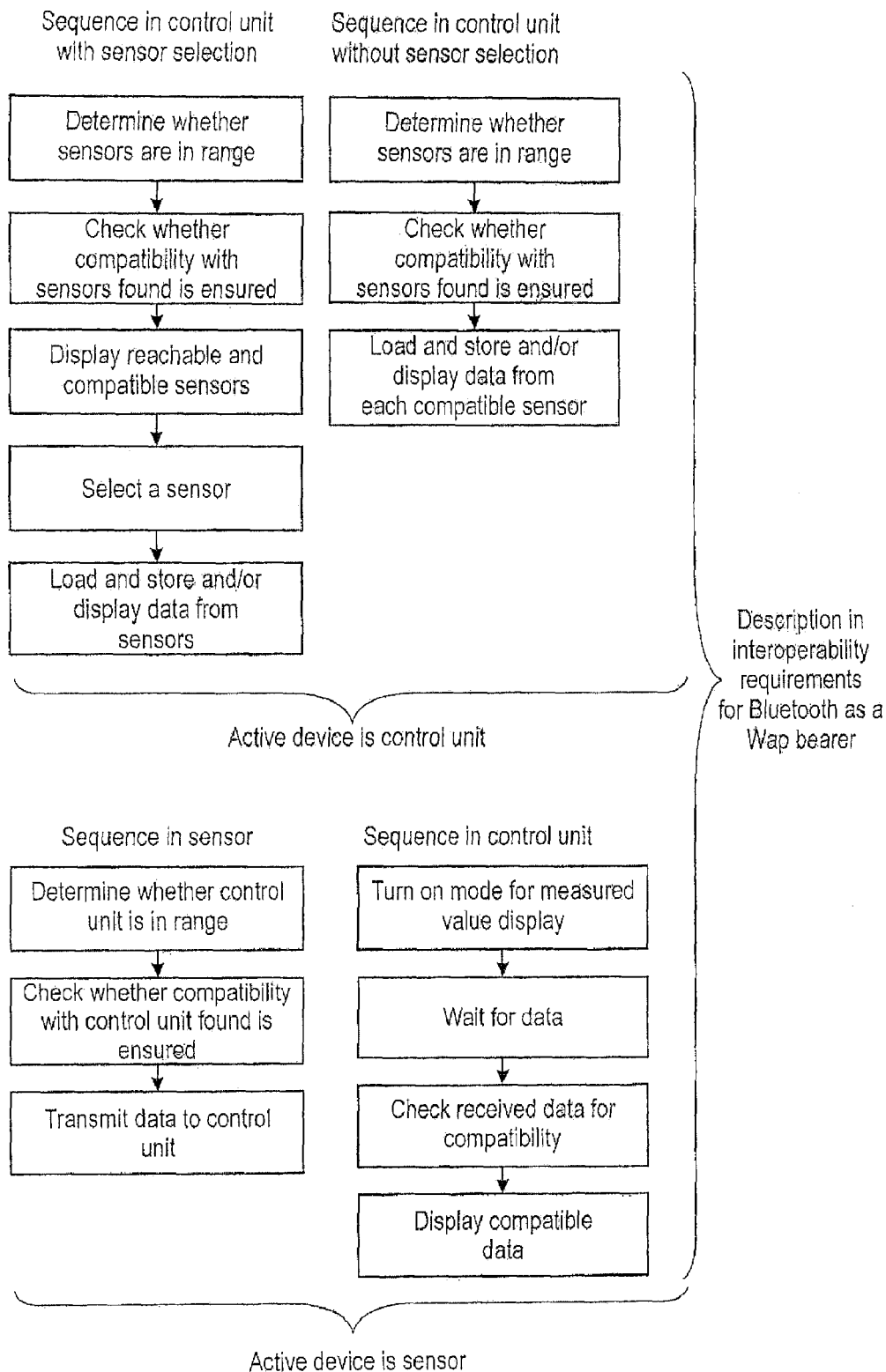
FIG. 3 shows a schematic flowchart of interoperability requirements for Bluetooth as a WAP transmission system for both a sensor according to the present invention and also a control unit.

FIG. 3 shows, in a schematic and simplified form, the basic sequence in a control unit with and without sensor selection when the active device is the control unit. Furthermore, a case in which a sensor according to the present invention is used as the active device is also shown herein. The sequence described herein relates to the interoperability requirements when Bluetooth is used as the WAP transmission means between a sensor according to the present invention and a transmission device according to the present invention.

Figure 4:
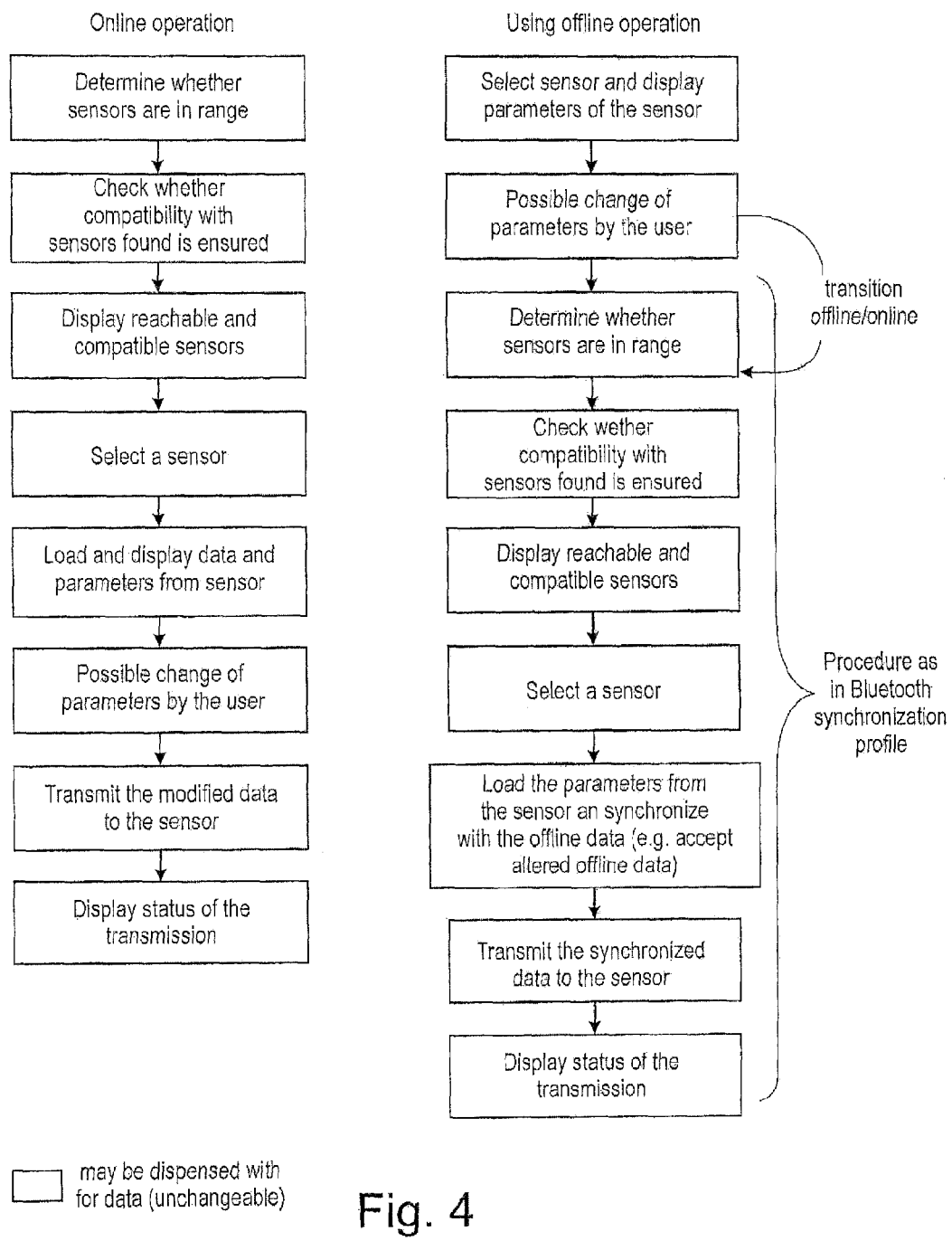
FIG. 4 shows a schematic flowchart for offline and online operation of the sensor according to the present invention.

FIG. 4 illustrates the synchronization profile for communication between a sensor according to the present invention and an environmental device according to the present invention when Bluetooth is used. FIG. 4 differentiates between online operation and offline operation. For further details, refer directly to FIG. 4 and the flowcharts shown therein.

Figure 5:
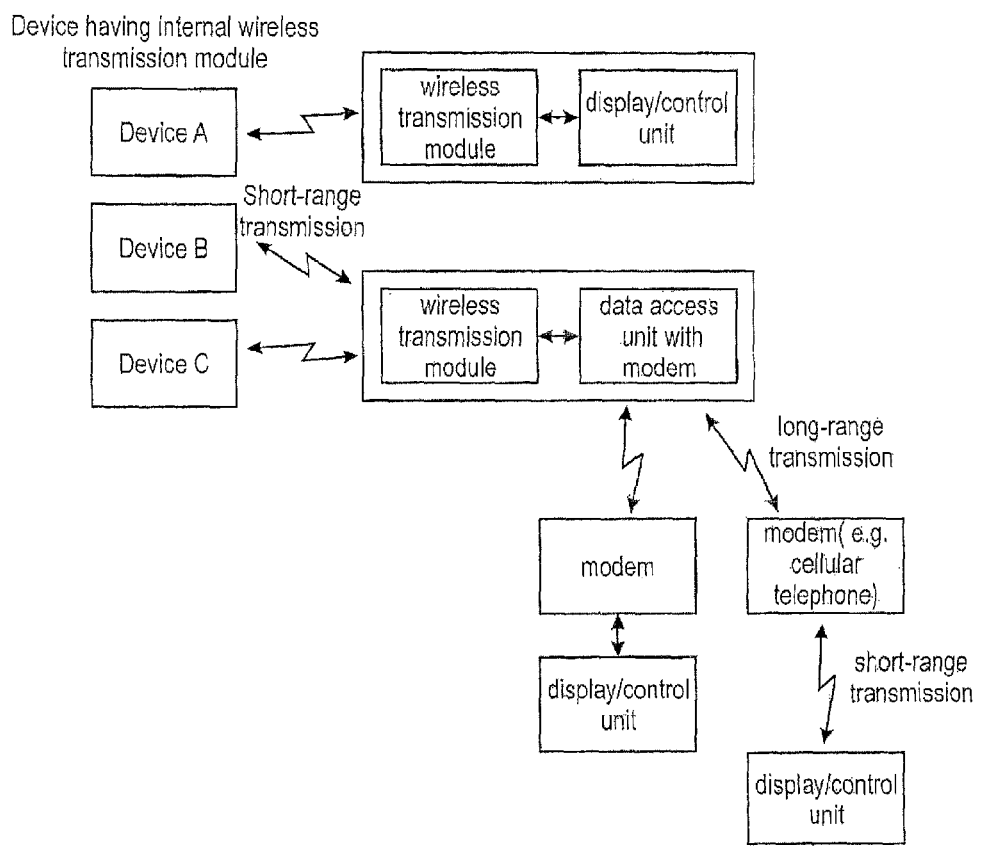
FIG. 5 shows a schematic block diagram of multiple sensors A, B, and C having one or more environmental devices according to the present invention.

Finally, FIG. 5 schematically shows a block diagram of the communication between different sensors A, B, and C and environmental devices according to the present invention. It is thus obvious therefrom that, for example, a sensor A communicates with an environmental device and a display occurs in this environmental device in accordance with the analysis of the transmitted measured signal. Vice versa, the sensor A may also be operated via the operating device provided in the environmental device.

In an alternative embodiment, sensors B or C perform a short-range transmission of measured signals, via Bluetooth, for example, to an environmental device. This environmental device then transmits the data in turn via modem over a long distance to a further modem, which is connected to a display. It is possible to perform the analysis in the environmental device, or to first perform the analysis in an analysis unit after the long-range transmission of the measured signals. A measured value is only then accordingly displayed on and/or transmitted to a process controller.

LIST OF REFERENCE NUMBERS 1 sensor unit
2 environmental device having an analysis unit
3 environmental device having a control and display unit
4 measured signal receiver
5 a/d converter
6 transceiver device
7 control processor
8 memory
9 analog measured signal
10 data output (measured signal receiver)
11 data input (a/d converter)
12 digitized measured signal
13 data output (aid converter)
14 data input (transceiver device)
15 radio signal (for example, non-analyzed measured signals)
16 transceiver device (environmental device having analysis unit)
17 digitized measured signal
18 analysis unit
19 measured value
20 process control system
21 control input (measured signal receiver)
22 control input (a/d converter)
23 control input (transceiver device)
24 transceiver device (environmental device having a control and display unit)
25 radio signal (status and parameter data)
26 operating device
27 display device
28 analysis processor
29 actuators
30 data output (transceiver device)
31 data input (measured signal receiver)
32 radio signal (control data)
33 environmental device having analysis unit, control and display unit
34 transceiver device (environmental device having analysis unit, control and display unit)
35 wire-bound signal (control data)

The invention claimed is:

1. A fill level sensor unit, comprising:
a measured signal receiver registering a measured signal;
an A/D converter digitizing the measured signal;
a transceiver device wirelessly transmitting data to an environmental device; and
a processor configured to only assume activating the measured signal receiver, the A/D converter, and the transceiver device in such a way that, that the measured signal is digitized and subsequently transmitted without signal processing after the A/D conversion, via the transceiver device, to the environmental device, the environmental device being coupled to an analysis unit which converts the measured signal into a measured value;

wherein the sensor is a fill level sensor; and wherein the measured signal receiver transmits and receives one of a radar signal, an ultrasound signal and a guided microwave signal.

2. The sensor unit of claim 1, wherein each of the measured signal receiver, the A/D converter, and the transceiver device includes (i) a data input, (ii) a data output and (iii) a control input, the data input of the A/D converter being connected to the data output of the measured signal receiver, the data input of the transceiver device being connected to the data output of the A/D converter, the transceiver device exchanging data with the environmental device via the corresponding data output, the processor controlling the measured signal receiver, the A/D converter, and the transceiver device via the corresponding control inputs.

3. The sensor unit of claim 1, wherein the measured signal is a propagation time signal.

4. The sensor unit of claim 1, wherein the wireless transmission of the data between the sensor unit and the environmental device is performed according to one of (i) a WLAN (IEEE 802.11) standard and (ii) a wireless personal area network standard (IEEE 802.15).

5. The sensor unit of claim 1, wherein the data transmission between the sensor unit and the environmental device is bidirectional.

6. The sensor unit of claim 1, wherein the environmental device is coupled to a process control system.

7. The sensor unit of claim 6, wherein the environmental device is wirelessly coupled to the process control system.

8. The sensor unit of claim 6, wherein the data transmission between the environmental device and the process control system is bidirectional.

9. The sensor unit of claim 6, wherein the environmental device is a mobile device.

10. The sensor unit of claim 1, wherein the sensor unit is wirelessly coupled to a further environmental device, the further environmental device including a control and display unit.

11. The sensor unit of claim 10, wherein the further environmental device is a mobile device.

12. The sensor unit of claim 10, wherein the environmental device is wirelessly coupled to the further environmental device.

13. The sensor unit of claim 10, wherein the data transmission occurs between the environmental device and the further environmental device and wherein the data transmission is bidirectional.

14. The sensor unit of claim 10, further comprising:

a further transceiver device communicating with the further environmental device.

15. The sensor unit of claim 10, wherein the wireless transmission of the data between at least one of (i) the sensor unit and the further environmental device and (ii) the environmental device and the further environmental device is performed according to one of (a) a WLAN (IEEE 802.11) standard and (b) a wireless personal area network standard (IEEE 802.15).

16. The sensor unit of claim 10, wherein the sensor unit exchanges parameter and status data with the further environmental device.

17. The sensor unit of claim 1, wherein (i) the analysis unit and (ii) a control and display unit are integrated into the environmental device.

18. The sensor unit of claim 1, wherein the sensor unit includes an interface for a wire-bound data transmission.

19. A data communication system, comprising:

a plurality of sensor units of claim 1; and an environmental device wirelessly communicating with the sensor units, the environmental device being coupled to an analysis unit.

20. The data communication system of claim 19, further comprising:

a further environmental device including a control and display unit.

21. An environmental device, comprising:

a transceiver device wireless communicating with at least one sensor unit of claim 19;

an analysis unit processing and converting a digital measured signal received from a sensor unit into a measured value, the analysis unit being one of (i) integrated into the environmental device and (ii) external to the environmental device.

22. The sensor unit of claim 1, wherein the processor exclusively assumes control tasks.

23. The sensor unit of claim 22, further comprising:

a memory arrangement coupled to the processor and storing parameters and calibration data for controlling a measurement sequence.

24. The data communication system of claim 19, further comprising:

a plurality of the sensor units;

wherein the processor exclusively assumes control tasks.

25. The data communications system of claim 19, further comprising:

a plurality of the sensor units; and a memory arrangement coupled to the processor and storing parameters and calibration data for controlling a measurement sequence.

26. The environmental device of claim 21, wherein the transceiver device is configured for wireless communication with at least one senor unit, wherein the processor exclusively assumes control tasks.

27. The environmental device of claim 21, wherein the transceiver device is configured for wireless communication with at least one sensor unit, wherein the sensor unit further includes a memory arrangement coupled to the processor and storing parameters and calibration data for controlling a measurement sequence.

* * * * *